Patented June 23, 1942

2,287,264

UNITED STATES PATENT OFFICE 2,287,264

PREPARATION OF MONOCALCIUM PHOSPHATE

Sihon C. Ogburn, Jr., Westfield, N. J., assignor to General Chemical Company, New York, N. Y., a corporation of New York No Drawing. Application July 20, 1940, Serial No. 346,552

7 Claims. (Cl. 23—109)

This invention relates to the preparation of food-grade monocalcium phosphate, and particularly to the treatment of monocalcium phosphate liquors for removal of iron from solution therein. The term "liquors" is used in the specification and claims to include solutions and slurries of phosphates.

Monocalcium phosphate for use in foods must, in order to meet purchasers' specifications, contain less than 0.07% iron calculated as $Fe_2O_3$. To meet this requirement monocalcium phosphate may be prepared by reacting food-grade phosphoric acid (pyrolytic material resulting from blast furnace or electric furnace operations, as is well known in the art) containing only about 0.05% iron calculated as $Fe_2O_3$, and best available hydrated lime. It has been attempted to produce monocalcium phosphate more cheaply by reacting lime with crude phosphoric acid prepared by the so-called "wet process" (treatment of phosphate rock with sulfuric acid). The crude acid is very much less expensive than food-grade acid, but on equivalent $P_2O_5$ basis contains about 1.3 to 1.6% iron calculated as $Fe_2O_3$. Reaction of crude acid with lime to form monocalcium phosphate as carried out prior to the present invention has resulted in the precipitation of a proportion of the iron and alumina present, i. e. as "white mud," but it has not been possible by this method to remove iron to the extent necessary to permit the production of a food grade monocalcium phosphate product.

Attempts have been made to secure a more complete removal of iron compounds by adding lime to the acid in excess of the amount required to form monocalcium phosphate, but such methods have not been found satisfactory, not only from the standpoint of the quality of the resultant product but also because they result in an excessive loss of phosphate value due to formation of dicalcium phosphate which precipitates and is removed with the "white mud."

It is an object of this invention to provide a process for removing iron from solution in monocalcium phosphate liquors containing excessive quantities thereof to permit the formation of food-grade monocalcium phosphate products from such liquors. It is an additional object to provide a process for the treatment of monocalcium phosphate liquors produced from crude phosphoric acid ("wet process" acid) as the starting material, which can readily be carried out in connection with the usual steps in processing such acid to produce monocalcium phosphate products, without involving substantial changes in such procedure or the use of complicated additional equipment.

Other objects and advantages of this invention will appear from the following detailed description thereof.

I have made the surprising discovery that the iron content of monocalcium phosphate liquors can be reduced to a value such as to permit the production of food-grade products by blowing air or other oxygen-containing gas having no deleterious effects on the product through the liquors while maintaining the acidity of the monocalcium phosphate liquor at a value not exceeding a pH of about 3 and preferably within the limits of 2 to 3, and also maintaining the temperature of the liquor below about 125° F., preferably not exceeding about 85° F. By operating in accordance with the conditions above specified I have found the iron in the liquor is oxidized substantially completely to the ferric state and precipitated as ferric phosphate, and this with a minimum loss of phosphate value, i. e. little, if any, of the phosphate is lost as dicalcium phosphate which would be separated from the liquor as part of the "white mud."

Desirably, the present invention is carried out in connection with the process for preparing monocalcium phosphate disclosed in my copending application Serial No. 324,651, filed March 18, 1940, directed to the production of monocalcium phosphate substantially free of or low in fluorine. As described in my copending application, the fluorine may be removed from a monocalcium phosphate liquor having a pH from about 1.5 to 3.5 and containing not more than about 0.03% fluorine by the addition of about 0.1% to 1.0% of bone black, agitating the resultant mixture for a time sufficient to cause the bone black to combine with the fluorine to reduce the fluorine content of the liquor to a value such that monocalcium phosphate crystallized therefrom has a fluorine content not exceeding about 0.001%, and separating the purified liquor from the bone black.

In carrying out this invention crude phosphoric acid is treated with lime in amount to form a monocalcium phosphate liquor having a pH of not exceeding 3 and preferably from about 2 to about 3. The reaction mixture is maintained under atmospheric pressure conditions at a temperature below about 125°, preferably between 65° and 85° F. Air or other oxygen-containing gas is bubbled through the monocalcium phosphate liquor from a perforated pipe at the bottom of the container for the liquor. The air blowing may commence at the time when the acid is first treated with lime or at a subsequent stage, and may continue throughout the time required for the addition of lime, and for the addition of bone black (disclosed in my aforesaid co-pending application) to remove fluorine if that step is employed. The air should be introduced in volume and for a period of time sufficient to oxidize all the ferrous iron present in the liquor to the ferric state and to maintain the iron in the oxidized condition until the liquor is filtered to remove precipitated impurities. Preferably, the air is introduced so as to agitate the liquor and maintain the precipitated solids and bone black in suspension, whereby a more complete removal of fluorine and other impurities from the liquor is realized.

The following example is given as illustrative of a preferred embodiment of the process of my invention. The invention is not to be construed as limited to the details set forth therein.

Example: 4045 pounds of crude phosphoric acid, previously treated to remove sulfate and containing 43% phosphoric acid expressed as $P_2O_5$, 0.0035% fluorine and 1.6% iron expressed as $Fe_2O_3$, were placed in a reaction tank provided with perforated pipes for the introduction of air, located near the bottom of the tank. 783 pounds of hydrated lime in aqueous suspension were added over a period of 3 hours, producing a monocalcium phosphate batch constituted of 20,000 pounds of slurry comprising "white mud" and monocalcium phosphate solution, and having a pH of 2.8. To this slurry were added 17 pounds of granular bone black. Air (previously filtered through a coke-packed drum) was blown through the liquid in the tank from the perforated pipes, 130 cubic feet of air per minute being thus supplied, and the air blowing being commenced upon initial addition of lime to the acid and continued for 4 hours during which period the bone black was added to the slurry. Upon completion of the air blowing the batch was filtered to remove bone black and precipitated impurities. The resultant monocalcium phosphate filtrate contained 0.010% iron, and the monocalcium phosphate crystals obtained from the filtrate contained only 0.045% iron.

My invention provides a simple and inexpensive procedure for securing the satisfactory removal of iron compounds from solution in monocalcium phosphate liquors and permits the manufacture of monocalcium phosphate of food-grade from inexpensive crude ("wet process") phosphoric acid. The monocalcium phosphate crystals produced in accordance with the invention have been found to contain an amount of iron below 0.07%; samples analyzed contained from 0.04% to 0.05% iron. The method requires no additional time and only a minimum of additional equipment over that required for known procedures in the manufacture of monocalcium phosphate. Furthermore, the improvement can be employed concurrently with the lime treatment in the preparation of monocalcium phosphate, and actually improves the lime treatment since the agitation effected by the air facilitates the reaction between the phosphoric acid and the lime.

It is to be understood that the invention is not restricted to the details of the present disclosure otherwise than as defined in the appended claims.

What is claimed is:

1. The method of removing iron from monocalcium phosphate liquor which comprises contacting the liquor with an oxygen-containing gas to substantially completely oxidize the iron to the ferric condition and thereby effect the formation of insoluble ferric phosphate, and separating the insoluble ferric phosphate thus formed from said monocalcium phosphate liquor, the pH value of the liquor during the contact thereof with the oxygen-containing gas and subsequent separation thereof from the insoluble ferric phosphate not exceeding about 3.

2. The method of removing iron from monocalcium phosphate liquor which comprises contacting the liquor with air at a temperature not exceeding about 125° F. to substantially completely oxidize the iron to the ferric condition and thereby effect the formation of insoluble ferric phosphate, and separating the insoluble ferric phosphate thus formed from said monocalcium phosphate liquor, the pH value of the liquor during the contact thereof with the oxygen-containing gas and subsequent separation thereof from the insoluble ferric phosphate not exceeding about 3.

3. The method of preparing monocalcium phosphate which comprises reacting lime with crude phosphoric acid containing substantial amounts of ferrous iron in solution so as to form a monocalcium phosphate liquor having a pH value not exceeding about 3, contacting the reaction mixture with an oxygen-containing gas to substantially completely oxidize the iron to the ferric condition and thereby effect the formation of insoluble ferric phosphate, and separating the insoluble ferric phosphate thus formed from said monocalcium phosphate liquor at a pH value not exceeding about 3.

4. The method of preparing monocalcium phosphate which comprises reacting lime and crude phosphoric acid containing substantial amounts of ferrous iron in solution at a temperature below about 125° F. to form a monocalcium phosphate liquor having a pH value between about 2 and about 3, blowing air through the reaction mixture to substantially completely oxidize the iron to the ferric condition and thereby effect the formation of insoluble ferric phosphate, separating the insoluble ferric phosphate thus formed from said monocalcium phosphate liquor at a pH value between about 2 and about 3, and crystallizing monocalcium phosphate containing not more than about 0.07% iron (expressed as $Fe_2O_3$) from said liquor.

5. The method of preparing monocalcium phosphate which comprises reacting lime with crude phosphoric acid containing substantial amounts of ferrous iron and fluorine in solution so as to form a monocalcium phosphate liquor having a pH value between about 2 and about 3, blowing air through the reaction mixture to substantially completely oxidize the iron to the ferric condition and thereby effect the formation of insoluble ferric phosphate, adding finely divided bone black to the monocalcium phosphate liquor formed while continuing the flow of air therethrough, separating the bone black and the insoluble ferric phosphate from said monocalcium phosphate liquor at a pH value between about 2 and about 3, and crystallizing monocalcium phosphate containing not more than about 0.07% iron (expressed as $Fe_2O_3$) and 0.001% fluorine from said liquor.

6. The method of preparing monocalcium phosphate which comprises reacting phosphate rock with sulfuric acid to form crude phosphoric acid containing substantial amounts of ferrous iron in solution, reacting lime with the crude phosphoric acid thus formed to form a monocalcium phosphate liquor having a pH value between about 2 and about 3, contacting the reaction mixture with an oxygen-containing gas to substantially completely oxidize the iron to the ferric condition and thereby effect the formation of insoluble ferric phosphate, separating the insoluble ferric phosphate thus formed from said monocalcium phosphate liquor at a pH value between about 2 and about 3, and crystallizing monocalcium phosphate containing not more than about 0.07% iron (expressed as $Fe_2O_3$) from said liquor.

7. The method of preparing monocalcium phosphate which comprises reacting lime with crude phosphoric acid containing iron and fluorine in solution to form a monocalcium phosphate liquor containing fluorine in amount less than about 0.03% and from about 1.3% to 1.6% iron, calculated as $Fe_2O_3$ and having a pH between about 2 and about 3, adding finely divided bone black to the liquor, blowing air through the liquor to agitate the mixture and to oxidize and precipitate the iron as ferric phosphate while maintaining the liquor at a temperature not exceeding 125° F., separating the monocalcium phosphate liquor from the bone black and precipitated impurities, and crystallizing monocalcium phosphate from the liquor, the period of air blowing and of contact between the liquor and bone black being sufficient for oxidation of substantially all of the iron to the ferric state and for combination of the bone black with the fluorine of the liquor so that the monocalcium phosphate crystallized from the liquor contains not more than about 0.07% iron and not more than about 0.001% fluorine.

SIHON C. OGBURN, Jr.